Figure 1:
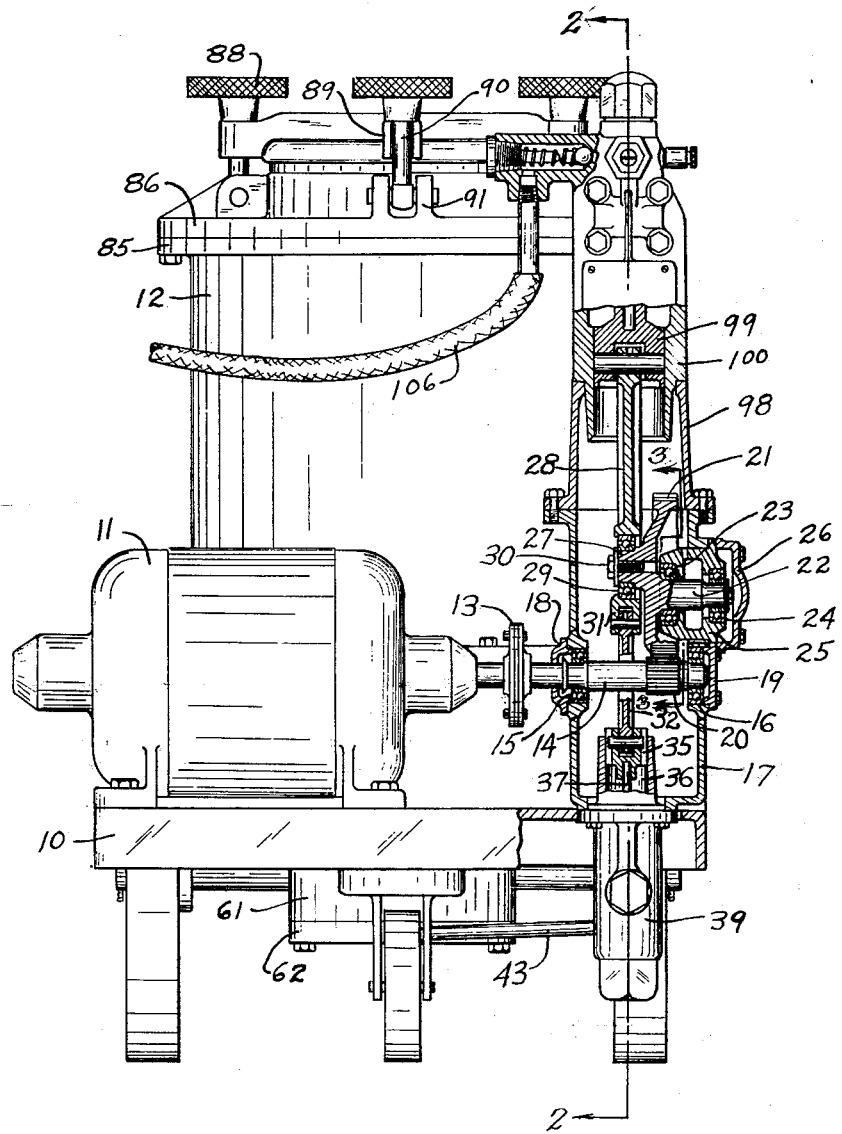

Aug. 15, 1933.     J. J. PELOUCH ET AL     1,922,109
LUBRICANT DISPENSING DEVICE
Filed March 17, 1932     3 Sheets-Sheet 1

Inventors
James J. Pelouch
Paul I. Schultz
By Bates Golrick & Teare
Attorneys

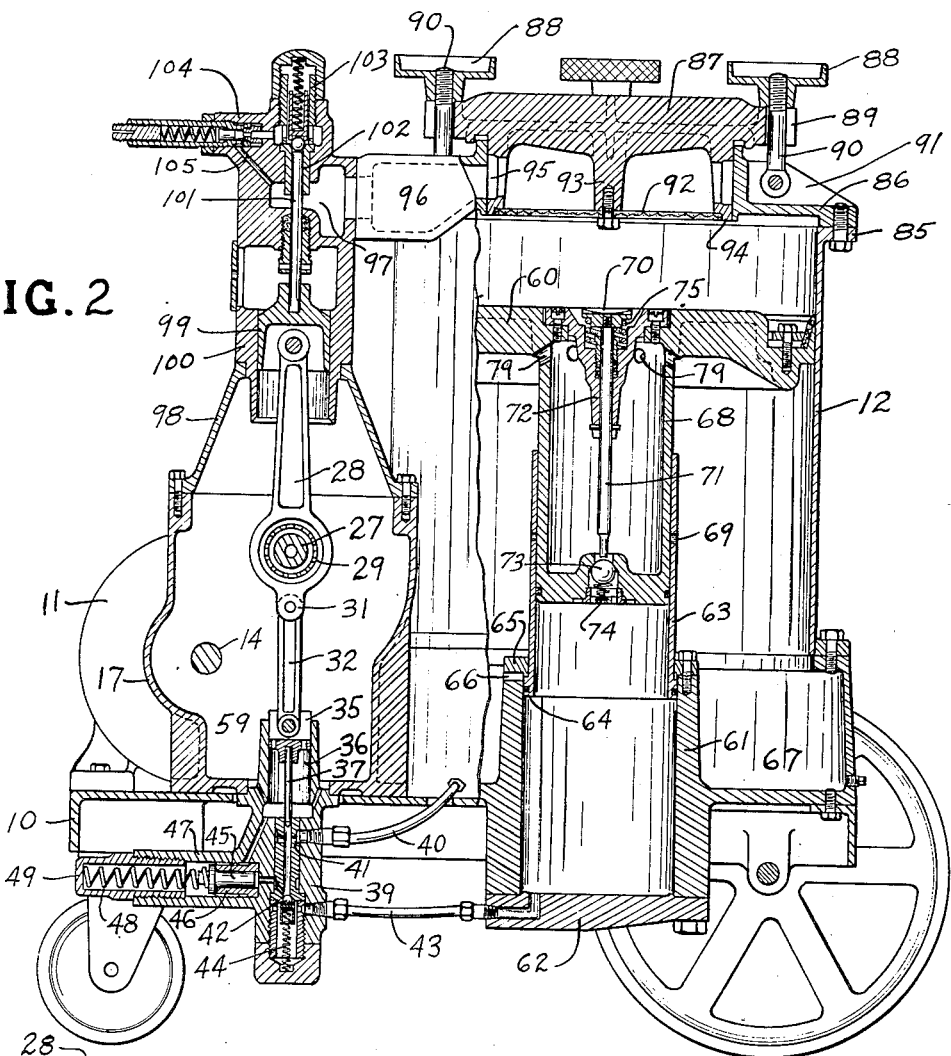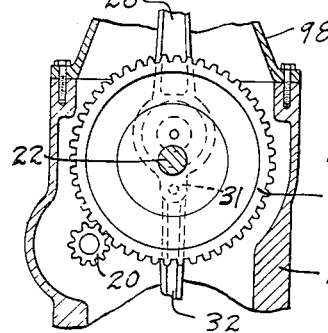

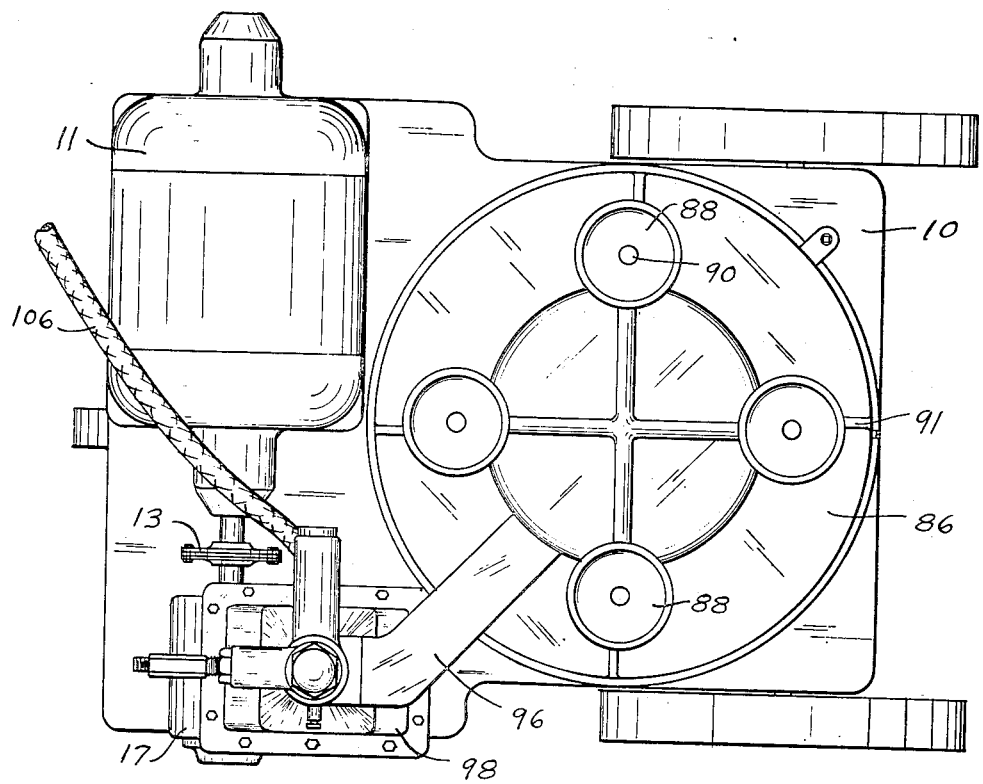
FIG. 4
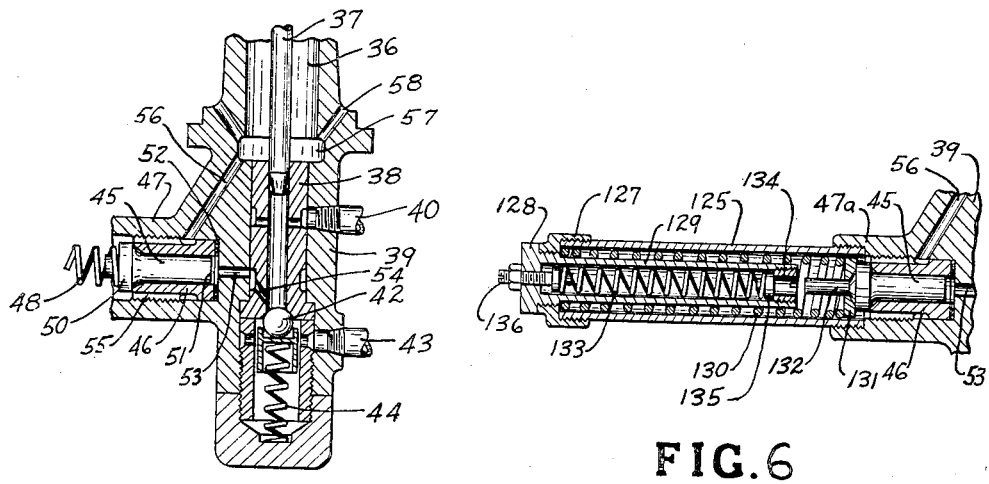
FIG. 5
FIG. 6

Patented Aug. 15, 1933                                                                                                  1,922,109

UNITED STATES PATENT OFFICE 1,922,109

LUBRICANT DISPENSING DEVICE

James J. Pelouch, Newburg Heights, and Paul I. Schultz, Cleveland, Ohio, assignors to The United States Air Compressor Company, Cleveland, Ohio, a Corporation of Ohio Application March 17, 1932. Serial No. 599,472

14 Claims. (Cl. 221—47.1)

This invention relates to lubricant dispensing devices, and more particularly to portable power grease pumps, such as are used in service stations for lubricating various parts of motor vehicles.

Heretofore, one form of power grease pump has been provided, which comprises a carriage having a grease tank and an electric motor thereon. The electric motor generally drives an air compressor and a booster pump, compressed air being used to force the grease from the tank to the booster pump. Such prior devices are satisfactory when comparatively light grease is employed, but they frequently do not operate successfully in conjunction with extremely heavy grease, which is comparatively hard and flows only under great pressure.

Accordingly, the general object of the present invention is to provide a portable power-actuated grease pump, which is adapted to deliver, rapidly and efficiently, the heaviest type of grease under the required pressure. Another object of the invention is to provide a sturdy and compact pump, which will require a minimum amount of care and maintenance. A further object is to provide a grease pump having a grease reservoir which may be easily filled.

Briefly, a power grease pump made according to our invention may comprise a wheeled carriage, which supports a lubricant reservoir or tank, and an electric motor. A piston or follower plate is provided within the reservoir and is adapted to force lubricant from the reservoir to a booster pump. The follower plate is actuated by a device similar to a hydraulic jack, and the electric motor drives the booster pump and a pump for supplying oil under pressure to the jack. The oil pump is designed to have a large overload capacity in order to operate the jack to supply lubricant to the booster pump as fast as the booster pump can receive it. The oil pump is provided with an expansion chamber, which functions automatically to insure the delivery to the jack of the required volume of oil at a predetermined working pressure.

Referring to the drawings, Fig. 1 is an elevation of the device, showing part of the pump mechanism and motor driving mechanism in cross section; Fig. 2 is a cross-sectional elevation, taken substantially along the line 2—2 of Fig. 1; Fig. 3 is a fragmentary cross-section, taken along the line 3—3 of Fig. 1; Fig. 4 is a top plan view of the pump; Fig. 5 is a cross-sectional detail on an enlarged scale, showing the oil pump and the pressure controlling device; and Fig. 6 is a cross-sectional detail of a modified form of pressure controlling device.

As shown in Figs. 1 and 2 of the drawings, a grease pump embodying our invention may comprise a wheeled carriage 10, which supports an electric motor 11, a substantially cylindrical grease reservoir or tank 12, and the necessary gearing and pumping mechanism. The electric motor 11 is connected preferably by a suitable flexible connection 13 directly to a shaft 14 which may be supported by ball bearings 15 and 16 carried by the casing 17. In order to provide convenient access to the bearings, detachable caps 18 and 19 may be secured to the casing adjacent the bearings 15 and 16, respectively. A pinion 20 may be suitably secured to the shaft 14 and may mesh with a gear 21, carried by a shaft 22. The shaft 22 may be likewise supported by ball bearings 23 and 24, which, in turn, are carried by the shroud 25.

In order to provide for easy access to the bearings 23 and 24, and for convenient assembly of the device, the shroud is detachably supported in the casing 17, and may be held in place by a cover plate 26, which may be suitably bolted to the casing. The bearing 23, it will be noted, is larger in diameter than the bearing 24, and the diameter of the shaft 22 is correspondingly varied. It will be seen, therefore, that the complete bearing assembly can be removed by detaching the cover plate and pulling the shroud to the right.

In order to actuate the booster pump and the oil pump from a common motor, the gear 21 has a crank pin 27 formed integrally therewith. A master connecting rod 28 extends upwardly from the crank pin, and is connected thereto by ball bearings 29, which may be secured in place by a bolt 30.

The connecting rod 28 is employed to operate the booster pump which will be hereinafter briefly described. The connecting rod 28 is also provided with a downwardly extending pivot member 31, to which the connecting rod 32, which is employed to actuate the oil pump, may be connected.

The oil pump, which supplies oil to the jack mechanism within the cylinder 12, may be mounted on the base 10 and may comprise a crosshead 35, which may operate in a suitable guide 36 and which may be pivotally connected to the connecting rod 32. A plunger or piston 37 may extend downwardly from the cross-head and, as shown in Fig. 2, may operate in a cylinder 38, supported within the casing 39, which may be formed integrally with the crosshead guide portion 36. Oil may be fed to the cylinder through the intake pipe 40, which supplies the oil from the sump which surrounds the jack mechanism. On the upstroke of the piston, the oil is drawn through the conduit, and the port 41, and on the down stroke back flow of the oil through the conduit is prevented by the piston which closes the port. The oil is forced out past the ball check valve 42, through the discharge conduit 43, and to the jack mechanism. The ball may be urged up towards its seat by a spring 44.

The motor operates at substantially constant speed, and to provide for the rapid and efficient delivery of grease under varying conditions of load, the pump is preferably designed to have a large overload capacity and to be capable of pumping several times as much oil as is normally required to deliver grease at the desired rate. To insure delivery to the jack of the proper quantity of oil at the required pressure, and to prevent the building up of excessive pressure in the oil pump, we may provide an expansion chamber, directly connected to the pump cylinder, which functions automatically to maintain the required pressure, regardless of varying demands for grease.

As shown in Figs. 2 and 5, this mechanism may comprise a plunger 45, slidably mounted and making a substantially oil-tight fit within a sleeve 46, which may be threaded within a hollow boss 47, projecting from one side of the pump casing. The plunger may be urged inwardly by a compression spring 48, the load on which may be adjusted by means of a cap 49, which may be threaded into the hollow boss. Inward movement of the plunger may be limited by engagement of a shoulder 50, with a corresponding shoulder on the sleeve and thereby a small expansion chamber, as at 51, may be formed. A washer 52 may be employed to prevent leakage around the sleeve.

The expansion chamber may be in direct communication with the pump cylinder through an opening 53 in the pump casing and a port 54 in the cylinder wall. If, on the down stroke of the piston 37, the back pressure in the conduit should be sufficient to cause pressure within the cylinder to build up the desired maximum, no more oil will be delivered to the conduit, but instead, the piston will force the oil into the expansion chamber, thus moving the plunger 45 back against the action of the spring. When the pressure within the cylinder is relieved by the up-stroke of the piston, the plunger will be moved inwardly by the action of the spring and the oil in the expansion chamber will be forced back into the cylinder. Because of this action, only as much oil will be drawn into the cylinder as is necessary to operate the jack at the desired rate. When the maximum pressure is attained, the plunger will reciprocate back and forth with each reciprocation of the piston, and will automatically maintain a constant pressure and insure the delivery of the required amount of oil.

In order to provide for the escape of any oil which may leak past the plunger and into the cap 49 which surrounds the spring, the sleeve is provided with slots as at 55, which allow any oil within the cap to be forced upwardly through the passageway 56 by the retracting movement of the plunger. The passageway 56 leads to a small chamber 57, which is positioned between the crosshead guide and the pump cylinder. Oil gathering from this chamber functions to lubricate the piston and crosshead guide. Any excess of oil in the chamber may escape through the opening 58 to the sump 59.

It will be seen that the expansion chamber construction has important advantages over a pressure-relief valve and by-pass. The wear which would take place in an ordinary valve due to wire drawing effect of oil under high pressure is entirely eliminated, and also the pump operates more efficiently. When a by-pass is employed, the pump delivers a constant volume of oil, part of which is by-passed and returned to the intake of the pump, whereas with the present device the volume of oil acted on by the pump varies in accordance with the demand.

We have also provided a modified form of expansion chamber construction which allows the pressure in the oil pump to be built up gradually. In this construction two springs are employed to control the pressure, the second spring coming into action as the pressure approaches the desired maximum. As shown in Fig. 6, the plunger 45 operates within the sleeve 46, which may be threaded within the hollow boss 47a. The boss 47a may project only a slight distance beyond the end of the sleeve and a tubular casing member 125 may be suitably threaded therein. An annular cap 127 may be secured to the end of the tubular casing member, and a plug 128 is provided with an inwardly extending tubular extension 129, and may be screwed into the cap. A compression spring 130 may be disposed within the tubular casing surrounding the tubular extension 129. One end of the spring may engage a shoulder of the cap 127 and the other end may engage a washer 131, which, in turn, may engage the plunger 45 and may surround the projection 132. A second compression spring 133 may operate within the tubular extension 129 and may be retained within the extension by means of a sleeve 134 and a plug 135.

In operation, as the pressure of the oil increases the plunger 45 will be forced back against the action of the spring 130 until the projection 132 engages the plug 135, and thereafter further movement of the plunger will be prevented until the pressure with the pump reaches a predetermined maximum. The tension of the spring 133 and thus the maximum pressure may be adjusted by any convenient means, as, for example, the screw 136. It will be seen that when this type of expansion chamber is employed, the pressure of the pump will be built up gradually and that sudden shocks to the pump mechanism are prevented.

To force the grease upwardly out of the reservoir 12, and deliver it to the booster pump, we have provided a plunger 60, preferably actuated by mechanism similar to a hydraulic jack. The fluid pressure for operating the jack is supplied by the oil pump through the conduit 43.

To minimize the overall height of the reservoir and to keep the center of gravity of the device low, as well as to make the grease capacity of the reservoir as large as possible, a telescopic jack made of three elements is preferably employed. The jack may comprise a cylinder 61, suitably mounted on the carriage 10, and may be provided with a cylinder head 62, through which the oil is admitted. A sleeve 63 may operate within the cylinder, and to prevent the sleeve from being forced out of the cylinder, a shoulder, as at 64, may be formed thereon and a ring 65 may be bolted or otherwise suitably secured to the cylinder. When the sleeve reaches the upper portion of the cylinder, the ring will engage the shoulder and prevent further movement of the sleeve. To allow for the escape of any oil which may be forced between the contacting surfaces of the sleeve and the cylinder wall, vents as at 66 may be provided. Oil flowing from the vents will drop into the sump 67.

The lubricant piston is actuated by a plunger 68, which may be formed integrally therewith, and which may operate within the sleeve. To relieve the pressure as the plunger approaches the end of its stroke, and to prevent the piston from being driven out of the reservoir 12, vents as at 69 may be provided in the upper part of the sleeve.

To relieve the hydraulic pressure in the cylinder and sleeve, when the piston has reached the upper limit of its travels, and substantially all of the grease has been forced out of the tank, we have provided a button 70 which is disposed in the center of the grease plunger. This button is connected to a rod 71, which is guided by a member 72 and suitably supported by the piston. Upon the downward movement of the button, the end of the rod will engage the ball valve 73 and open the valve against the action of the spring 74, thus allowing the oil within the cylinder sleeve to flow into the hollow piston and finally out of the openings 79 and down into the sump. The rod is normally held in a raised position by a compression spring 75, which engages the member 72 and a shoulder on the button.

To provide a conduit for the delivery of grease to the booster pump, and also to provide a closure for the cylinder 12, the top of the cylinder is equipped with a flange 85, to which an annular member 86 may be bolted or otherwise suitably secured. The central portion of the annular member may be closed by a cover plate 87, which may be removably attached thereto as by hand nuts 88, which engage bifurcated projections 89 on the cover plate and which are threaded onto bolts 90 pivotally mounted on webs 91, formed integrally with the annular member 86. To remove coarse impurities from the grease, the cover plate may have attached thereto a screen 92, which may be suitably supported from a downwardly projecting central boss 93, and a downwardly projecting ring or flange 94. The ring or flange 94 may be provided with ports as at 95, one of which is adapted to register with the discharge conduit 96, which is formed in the annular member 91 and which communicates with the booster pump intake chamber 97. It will be seen that all grease delivered to the booster pump must pass through the screen. Furthermore, the screen may be readily cleaned whenever the cover plate is removed, as the impurities will be collected on the lower side thereof.

The booster pump is supported on a casing member 98, which may be suitably secured to the base member of the casing 17, and may comprise a crosshead 99, operated by the connecting rod 28 and supported by the cross head guide 100. A plunger 101 may be mounted on the cross head and may operate within a cylinder 102. The intake to the pump may be through the end of the cylinder adjacent the intake chamber 97 and the discharge may take place through a check valve of the usual type indicated at 103. In order to prevent building up of excessive pressures within the pump, a relief valve 104, leading to a by-pass 105, may be provided, the by-pass 105 leading back to the intake chamber 97. If desired, the expansion chamber construction shown in Figs. 5 and 6 may be employed in conjunction with the booster pump, instead of a relief valve and by-pass. The discharge port of the pump leads to a flexible delivery conduit 106, which may be provided with the usual type of fitting, and controls, (not shown).

The operation of the device may be summarized as follows:

Starting with the cylinder empty and the grease piston at the top of the tank 12, the operator pushes down on the button in the center of the piston, thus opening the relief valve within the hydraulic jack, and allowing the piston to be forced to the bottom of the cylinder 12. The oil within the jack will flow through the ports, and into the sump. After the cylinder 12 has been filled with grease and the cover plate 87 secured to the top of the cylinder, the operation of the motor will result in the hydraulic pressure pump withdrawing oil from the sump and rapidly delivering it to the hydraulic jack until sufficient pressure is built up to force the grease through the screen and the conduit 96, into the booster pump which will discharge it through the flexible discharge conduit. Although the motor drives the oil pump at substantially constant speed, the expansion chamber, connected to the pump cylinder, will function to maintain the normal working pressure under varying load conditions, and sufficient oil will always be delivered to the hydraulic jack to force the required amount of grease to the booster pump. As the grease piston approaches the top of the cylinder, further movement will be stopped when the piston of the hydraulic jack uncovers the port in the sleeve, thus releasing the oil pressure within the jack.

From the foregoing description of a preferred form of our device, it will be seen that we have provided a simple and sturdy power grease pump which is adapted efficiently to handle the heaviest types of grease. It is also evident that our grease pump can be conveniently operated, is substantially fool-proof, and will require a minimum amount of care.

We claim:

1. In a lubricant dispensing device, the combination of a reservoir adapted to contain a supply of lubricant, a piston movable within said reservoir, a liquid actuated jack for raising said piston to eject lubricant from the reservoir, a pump for supplying liquid under pressure to said jack, a booster pump, said pumps having their cylinders in vertical alignment, a conduit between said booster pump and said reservoir, and a single motor-driven crank disposed between said cylinders for driving said booster pump and said pump for supplying liquid under pressure to said jack.

2. In a lubricant dispensing device, the combination of a booster pump, a reservoir adapted to contain a supply of lubricant, a conduit leading from said reservoir to said booster pump, means for forcing lubricant out of said reservoir and to said pump comprising a piston operable within said reservoir, a fluid actuated jack for operating said piston, said jack comprising a cylinder, a sleeve slidably mounted within said cylinder, and a plunger directly connected to said piston and operable within said sleeve, and means for supplying liquid under pressure to said jack.

3. In combination in a device of the character described, a booster pump, a reservoir adapted to contain a supply of lubricant, a conduit connecting said reservoir and said pump, means for forcing lubricant out of said reservoir and to said booster pump, comprising a piston operable within said reservoir, a liquid-operated jack for operating said piston, and a pump supplying liquid under pressure to said jack, said last mentioned pump having a cylinder, a plunger operable therein, an expansion chamber directly connected to said cylinder, and means in the chamber for returning liquid to the pump, while maintaining the required pressure of liquid on the jack, and without recirculating the liquid.

4. In a device of the character described, a portable unitary structure comprising in combination, a reservoir adapted to contain a supply of lubricant, a piston operable within said reservoir and adapted to force lubricant from the said reservoir, a liquid-actuated jack for operating said piston, said jack including a cylinder and a sleeve, a pump for supplying liquid under pressure to said jack, a motor adapted to drive said pump and means associated with said pump for maintaining substantially constant pressure on the lubricant in the reservoir under varying rates of lubricant consumption without recirculating the liquid.

5. In a device of the character described, a portable unitary structure comprising in combination, a reservoir adapted to contain a supply of lubricant, a piston operable within said reservoir and adapted to force lubricant therefrom, a liquid actuated jack for operating said piston, said jack including a cylinder and a sleeve, a pump for supplying liquid under pressure to said jack, said pump having a cylinder and a piston operable therein, a motor for driving said pump and means to insure the delivery of the required amount of liquid by the pump under varying rates of lubricant consumption, comprising an expansion chamber directly connected to the cylinder of the pump for returning liquid to the pump without recirculating it.

6. In a device of the character described, the combination of a booster pump, a hydraulic pressure pump, said pumps having their cylinders in substantial vertical alignment and spaced apart, a casing extending between the cylinders of said pump and means within said casing for operating both of said pumps, said operating means comprising a power shaft, bearings in opposite walls of said casing for supporting said power shaft, a pinion on said power shaft between said bearings, a gear adapted to mesh with said pinion, a shaft projecting on one side of said gear, spaced bearings for supporting said shaft, means for removably supporting said bearings on one side of said casing, a crank pin projecting from said gear on the side opposite said shaft and connecting rods engaging said crank pin and extending to said booster and hydraulic pressure pump.

7. In a device of the character described, a reservoir adapted to contain a supply of lubricant, a hollow piston operable within said reservoir and adapted to force lubricant upwardly out of the reservoir, a liquid-actuated jack for actuating said piston, and means for relieving the pressure within said jack, thereby allowing the piston to be moved downwardly, including a valve in said jack and means extending through and accessible from above the piston for operating the said valve.

8. In a device of the character described, a reservoir adapted to contain a supply of lubricant, a piston operable within said reservoir and adapted to force lubricant out of the reservoir, said piston having a passageway therethrough, a liquid actuated jack for advancing said piston, a normally closed valve in said jack and means extending through said passageway for unseating the valve to relieve the pressure within said jack, thereby allowing the piston to be retracted, said means being disposed within the piston and operable through the reservoir.

9. In a device of the character described, the combination of a reservoir adapted to contain a supply of lubricant, a piston operable within said reservoir and adapted to force lubricant out of the reservoir, a liquid actuated jack for operating said piston, said liquid actuated jack having two relatively movable members, one of said members having an opening therein, said opening being normally covered by the other member, and uncovered by extreme relative movement of the members, whereby the pressure within the jack is released and the travel of the piston limited.

10. In a device of the character described, the combination of a reservoir adapted to contain a supply of lubricant, a piston operable within said reservoir and adapted to force lubricant out of the reservoir, a liquid actuated jack for actuating said piston, said jack comprising a cylinder, a sleeve operable within said cylinder and a plunger operable within said sleeve and directly connected to said piston, means for relieving the pressure within said jack comprising a valve in said plunger, and means for opening said valve extending through and accessible from above said piston.

11. In a device of the character described, the combination of a booster pump adapted to deliver lubricant, a reservoir adapted to contain a supply of lubricant, said reservoir having an annular member secured to the top thereof and a conduit formed in said annular member, a closure adapted to be secured to said annular member, a screen carried by said closure and a piston within the reservoir adapted to force grease upwardly through said screen and into said conduit to said booster pump.

12. In a device of the character described, the combination of a carriage, a motor mounted thereon, a booster pump and an oil pump mounted on the carriage and adapted to be driven by the motor, a reservoir adapted to contain a supply of lubricant, a liquid-actuated jack disposed in the lower portion of said reservoir, said jack being operable by said oil pump, a piston connected to the upper part of said jack for forcing lubricant out of said reservoir, a conduit for lubricant extending between said reservoir and said booster pump and a screen interposed between said reservoir and said conduit, whereby operation of the jack will cause lubricant to be forced upwardly through said screen and conduit and to said booster pump.

13. In a device of the character described, the combination of a reservoir adapted to contain a supply of lubricant, a piston operable therein and adapted to force lubricant from said reservoir, a conduit adapted to conduct lubricant from said reservoir, a removable closure member for said reservoir disposed adjacent the conduit at the top of the reservoir, a screen carried by said closure member, said screen, when the closure member is in place, being interposed between said reservoir and said conduit, whereby lubricant discharged from said reservoir must pass through said screen.

14. In a device of the character described, the combination of a pump having a piston and a cylinder, and an expansion chamber connected to said cylinder, said expansion chamber comprising a cylinder and a plunger therein, a spring in engagement with said plunger and adapted to resist movement thereof, and another spring adapted to be engaged by the plunger after some movement of the plunger has taken place and to resist further movement thereof, said springs acting on the plunger to redeliver material to the pump without recirculating it.

JAMES J. PELOUCH.
PAUL I. SCHULTZ.